W. & T. Schnebly.
Harvester Rake.
No. 24,495.        Patented June 21, 1859.
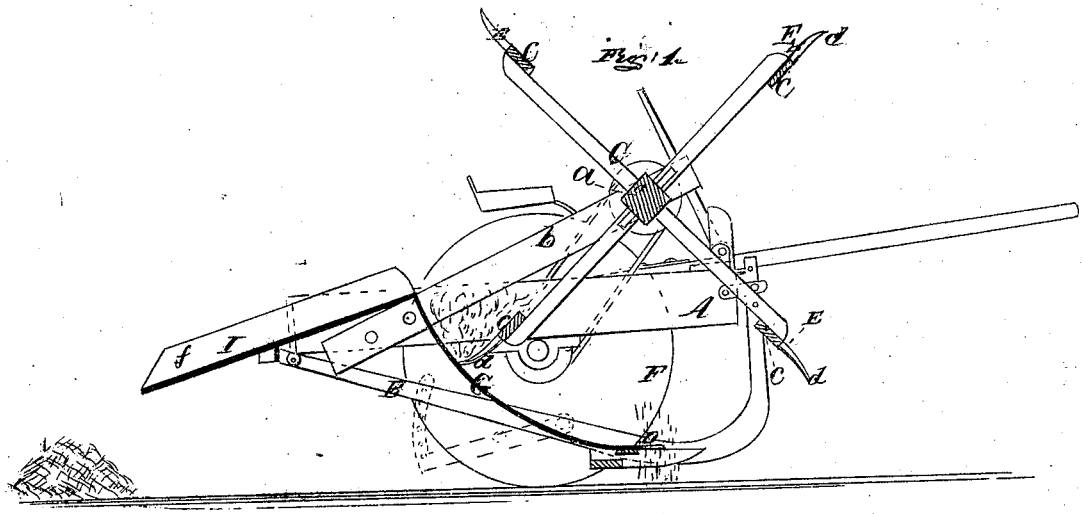
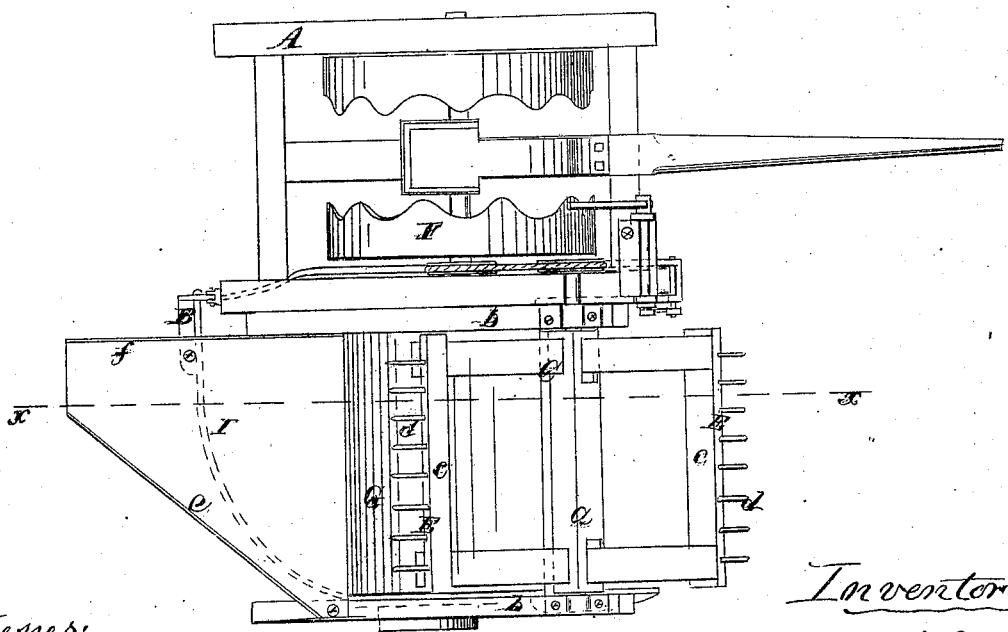
Witnesses:
J. W. Coomb
Mich Hughes
Inventors:
W. Schnebly
Tho. Schnebly

UNITED STATES PATENT OFFICE.

WILLIAM SCHNEBLY AND THOMAS SCHNEBLY, OF HACKENSACK, N. J.

IMPROVEMENT IN HARVESTING-MACHINES.

Specification forming part of Letters Patent No. 24,495, dated June 21, 1859.

*To all whom it may concern:*

Be it known that we, WILLIAM SCHNEBLY and THOMAS SCHNEBLY, both of Hackensack, in the county of Bergen and State of New Jersey, have invented a new and Improved Raking Attachment for Harvesters; and we do hereby declare that the following is a full, clear, and exact description of the same, reference being had to the annexed drawings, making a part of this specification, in which—

Figure 1 is a vertical section of our invention, taken in the line $x\ x$, Fig. 2. Fig. 2 is a plan or top view of the same.

Similar letters of reference indicate corresponding parts in the two figures.

To enable those skilled in the art to fully understand and construct our invention, we will proceed to describe it.

A represents the main frame of a harvester, which may be constructed in any of the usual ways; and B is a platform-frame, attached to one side of the main frame A.

C is a reel, which may also be constructed in the usual or any proper manner, its shaft $a$ being hung in inclined bars $b\ b$, or in any suitable supports. This reel is placed in the usual position relatively with the sickle D, and any proper number of beaters, $c$, may be employed.

To one or more of the beaters $c$ of the reel C a rake-head, E, is attached. These rake-heads are provided with the usual teeth, $d$. The reel C is rotated from the driving-wheel F by any proper means.

G is the platform, which is attached to the frame B, and is of curved form, corresponding or approximating to the sweep of the rake-heads E. (See Fig. 1.) This curved or concave platform may be either of metal or wood, and it extends the whole length of the reel. To the front end of the platform G any of the reciprocating sickles D may be attached, the platform having an inclined position, the front end, to which the sickle is attached, being the lowest, as shown clearly in Fig. 1.

To the upper and back end of the platform G an inclined trough, I, is attached. This trough is of taper form—that is to say, it gradually decreases in width from its upper to its lower end, the outer side strip, $e$, having an oblique position with the inner one, $f$, as shown clearly in Fig. 2. The upper end of the trough I is equal in width to the platform G, as also shown in Fig. 2.

The operation of the device is as follows: As the machine is drawn along the reel C rotates as usual, its beaters C presenting the grain to the action of the sickle, and the rake-heads E raking the cut grain up the inclined curved platform G, heads foremost, and placing the same on the trough I, the grain descending in the trough by its own gravity and passing off the lower end of the trough I in the form of gavels, the grain being discharged in a compact state, owing to the contracted dimensions of the discharge end of the trough I, as shown clearly in Fig. 2.

We do not claim the placing of rake-teeth upon the reel, nor the employment therewith of a concave platform; but,

Having thus described our invention, we claim and desire to secure by Letters Patent—

The arrangement and combination of the inclined tapering discharge-trough I with the concave or curved platform and raker-reel, whereby the grain is made to fall from the machine in compact gavels, as herein shown and described.

W. SCHNEBLY.
THOS. SCHNEBLY.

Witnesses:
J. W. COOMBS,
MICH. HUGHES.